United States Patent [19]

Tero

[11] Patent Number: 4,502,322

[45] Date of Patent: Mar. 5, 1985

[54] APPARATUS FOR DETECTING LEAKS IN STEAM RAISING BOILERS

[75] Inventor: Brian A. Tero, Tonbridge, England

[73] Assignee: Lintvalve Electronic Systems Limited, London, England

[21] Appl. No.: 546,731

[22] Filed: Oct. 28, 1983

[30] Foreign Application Priority Data

Nov. 5, 1982 [GB] United Kingdom ............... 8231672

[51] Int. Cl.³ ............................................. G01M 3/08
[52] U.S. Cl. .................. 73/40.5 A; 73/49.1; 122/504; 431/16
[58] Field of Search ............ 73/40.5 A, 49.1, 702; 431/16; 122/504

[56] References Cited

U.S. PATENT DOCUMENTS 2,008,934 7/1935 Smith ............................. 73/40.5 A
2,966,209 12/1960 Pegrum ............................. 431/16

Primary Examiner—Donald O. Woodiel
Attorney, Agent, or Firm—Shoemaker and Mattare, Ltd.

[57] ABSTRACT

Apparatus for monitoring the escape of steam from the tubes of a power station boiler or the like employs a microphone located externally to the combustion space to sense an increase in combustion space noise level. At least one long narrow listening tube leads from the combustion space and has at its end an elbow to which is sealed a microphone assembly that senses the noise in the combustion space. Preferably a diaphragm is interposed between the microphone assembly and listening tube that seals the end of the listening tube while transmitting sound substantially unattenuated. The diaphragm is a plastics sheet compressed between washers that have an undulating line of contact. Noise from escaping steam at a frequency of 4–8 KHz may be detected with a gain of typically −20 db. The signal from the microphone assembly is amplified and processed by means to indicate the level of sound in the combustion space.

6 Claims, 3 Drawing Figures

APPARATUS FOR DETECTING LEAKS IN STEAM RAISING BOILERS

FIELD OF THE INVENTION

The present invention relates to apparatus for detecting steam leaks in steam raising boilers of power stations and the like.

BACKGROUND TO THE INVENTION

The combustion space of a power station boiler is typically 100 ft by 100 ft in plan and has a multiplicity of steam tubes passing therethrough. A leak of steam from one of the tubes can cause a drop in efficiency of the boiler and can result in secondary damage to the boiler tubes and also to the boiler roof. But at present there is no direct way of monitoring for the presence of a steam leak. It is known that escape of steam results in an increased noise level in the boiler, but locating a microphone within the combustion space is impractical because of the high ambient temperatures and also because of the acidic and dusty atmosphere.

SUMMARY OF THE INVENTION

The present invention provides apparatus for detecting the presence of a steam leak in a steam raising boiler comprising at least one long narrow listening tube leading from the boiler combustion space and provided at its end remote from said combustion space with an elbow, a microphone assembly sealed to the elbow for reception down the listening tube of noise in the combustion space, means for deriving and amplifying a signal from a microphone in said microphone assembly, and means responsive to said amplified signal for indicating the level of sound in said combustion space.

DESCRIPTION OF PREFERRED FEATURES

In the above apparatus the microphone assembly is at the end of a listening tube that is typically only 1 meter long and communicates directly with the combustion space and the microphone itself is isolated from the gas inside the listening tube simply by a detensioned membrane of Melanex or other plastics material. Thus the apparatus may include a diaphragm interposed between the microphone and the listening tube that seals the end of the listening tube while transmitting sound substantially unattenuated, said diaphragm consisting of a plastics sheet compressed between a pair of sealing washers that have an undulating line of contact. It is surprising that a microphone can be made to work in such close proximity to the hostile boiler environment, and it is an advantage of the present arrangement that the microphone is effectively isolated from external noise but is sensitive to noise variation in the combustion space.

The above apparatus can enable steam leaks to be detected at an early stage, permits the detection of small leaks, and, if a multiplicity of listening tubes is distributed about the combustion space as is preferred, permits easier location of the leak. Early leak detection permits damage to the boiler roof to be avoided. The apparatus can also check on the correct operation of soot blowers and safety valves, enables suspect boiler tubes to be monitored constantly, enables outage time to be planned to suit demand and to be reduced in duration, and enables forced outage to be predicted.

BRIEF DESCRIPTION OF THE DRAWINGS

An embodiment of the invention will now be described, by way of example only, with reference to the accompanying drawings, in which.

DETAILED DESCRIPTION OF PREFERRED EMBODIMENTS

Figure 1:
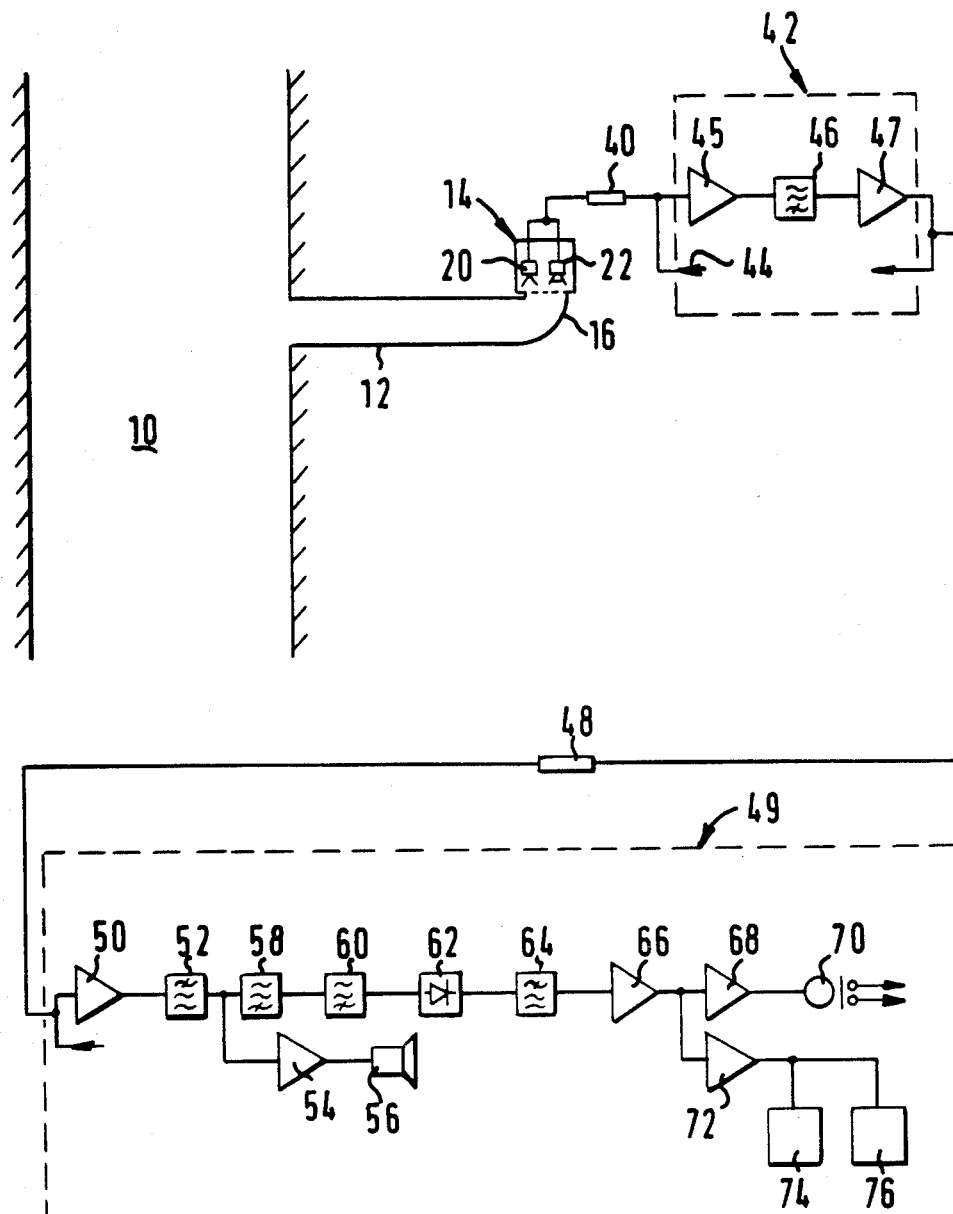
FIG. 1 is a schematic diagram illustrating a single channel of an acoustic steam leak detector.

In FIG. 1, a boiler combustion space 10 of a steam raising plant has in its walls a multiplicity of listening tubes 12 that are typically about 1 meter in length. The free end of each tube is formed with an elbow 16 mounting a microphone assembly 14 at right angles and vertically above the listening tube or at an appropriate position other than vertically below the listening tube to avoid dirt collecting on the microphone assembly. The elbow section 16 is made of a plastics material which in the event of excessive boiler pressure causing hot gas to rush along the listening tube 12 acts as a heat fuse ie. the heat and pressure will cause the elbow 16 to be pierced straight through so that the hot gas will largely by-pass the microphone assembly 14 which will not be damaged. In normal use, a dead leg or insulating cushion of stagnant gas forms within the tube 12 which reduces the temperature adjacent the microphone assembly 14 to an acceptable level, and furthermore the elbow 16 isolates the microphone assembly from exposure to radiant heat from the combustion space 10. But sound from the combustion space travels well in air, and the listening tube (which should be designed to prevent there being undesirable harmonics) is effective to lead the desired sound to the sensing microphone assembly 14.

Figure 2:
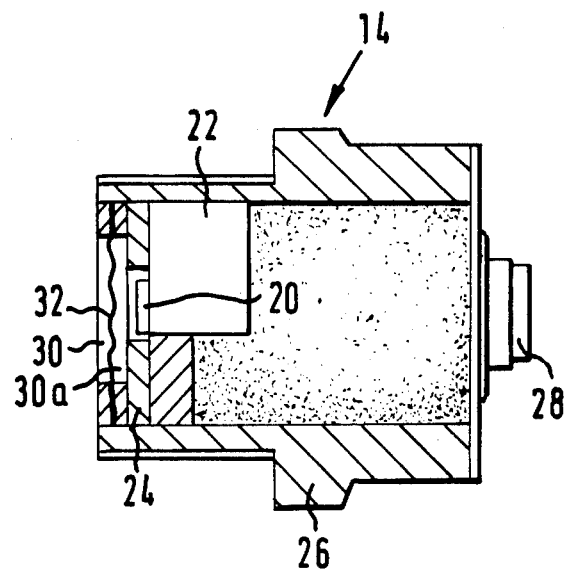
FIG. 2 is a view in longitudinal section of a microphone assembly that forms part of the detector system of FIG. 1.
Figure 3:
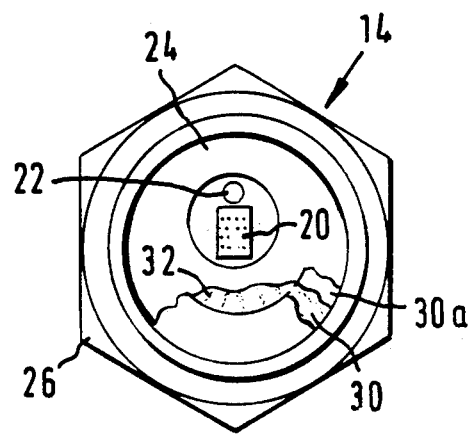
FIG. 3 is an end view of the microphone assembly of FIG. 2.

The microphone assembly 14 is shown in more detail in FIG. 2. A microphone 20 is mounted together with tweeter 22 behind a baseplate 24 that is attached to microphone body 26. The microphone 20 and tweeter 22 are electrically connected to a cable socket 28 and the space within the body 26 behind the microphone and tweeter is filled with potting. This seals the microphone assembly to reduce the differential pressure across the membrane to a permissable level and avoids membrane fracture.

The front face of the body 26 supports a pair of mating hard rubber sealing rings 30, 30a that meet along a wavy line as shown and seal between them a detensioned membrane 32 of Melanex or other plastics material. The effect of the wavy edge of sealing rings 30, 30a is to produce undulations in all directions in the membrane 32 which is thereby maintained in a floppy state in which all membrane stresses are relieved and it is protected from rupture in the hot acidic environment to which it is exposed and which would otherwise destroy it.

Referring again to FIG. 1, the microphone assembly is connected via cable 40 to local amplifier assembly 42 that includes a power source 44 for the tweeter 22, a filter 46 for the signal from microphone 20, a preamplifier 45 and a voltage to current converter 47. The signal is further transmitted along cable 48 to a monitor station 49 in the control room for the furnace. The current signal is converted to voltage in converter 50, to remove unwanted frequencies, amplified by power amplifier 54 and reproduced by monitor loudspeaker 56. The signal from filter 52 also passes through further filter stages 58 to accentuate the steam leak frequency band, is rectified by precision rectifier 62 and is passed via a further filter 64 to a logarithmic voltage converter 66 which is scaled to produce an output level corresponding to that sensed by the ear. The output signal from converter 66 is applied to trip comparator 68 where it is compared to a preset alarm level and when the alarm level has been exceeded for an appropriate predetermined time, the coil of relay 70 is energised to sound an alarm. The circuit therefore incorporates a timer (not shown) that effectively provides further filtration against transient sound occurring in the boiler during normal operation that would otherwise be confused with a steam leak and has a duration adjustable typically between a fraction of a minute and a few minutes. The output from converter 66 is also passed to voltage to current converter 72 the output of which is supplied to a barchart display 74 and/or a chart recorder 76.

The noise level prevailing in the boiler in the absence of a steam leak is normally below the ambient noise level outside the boiler (i.e. the external noise is greater than the internal), which is why it is difficult to perceive a steam leak simply by listening from outside the furnace. The microphone 20 is located in a sealed assembly 14 at the end of listening tube 12 and is insulated from the external ambient noise, there being typically a −20 db gain. Noise of escaping steam within the combustion space 10 is usually at a frequency in the range 4–8 KHz depending upon the size of the steam leak, the intensity of the noise increasing gradually over a period of several days as the leak develops. The noise level within the combustion space in the steam leak frequency range varies depending on location but is typically about 60 db in normal operation but may rise to about 100 db in the event of a steam leak. An alarm limit about 10 db above the working noise level and in this instance about 70 db will normally be appropriate.

The tweeter 22 serves to test the system including the microphone 20 while the system is operational. It is suitable for remote operation and provides an artificial alarm condition by which the operation of the system can be checked.

It will be appreciated that various modifications can be made to the embodiment described above without departing from the invention, the scope of which is defined in the appended claims.

I claim:

1. Apparatus for detecting the presence of a steam leak in a steam raising boiler comprising at least one long narrow listening tube leading from the boiler combustion space and provided at its end remote from said combustion space with an elbow, a microphone assembly sealed to the elbow for reception down the listening tube of noise in the combustion space, means for deriving and amplifying a signal from a microphone in said microphone assembly, and means responsive to said amplified signal for indicating the level of sound in said combustion space.

2. Apparatus according to claim 1, wherein said elbow is at least in part formed from a plastics material that is ruptured by hot gas passing down the listening tube if there is excessive boiler pressure to cause said hot gas to by-pass said microphone assembly.

3. Apparatus according to claim 1 wherein the microphone assembly includes a diaphragm interposed between the microphone and the listening tube that seals the end of the listening tube while transmitting sound substantially unattenuated, said diaphragm consisting of a plastics sheet compressed between a pair of sealing washers that have an undulating line of contact.

4. Apparatus according to claim 1, wherein the microphone assembly further comprises a sound source that is energisable to check the operation of the microphone.

5. Apparatus according to claim 1, wherein the signal deriving means includes filter means that selectively passes signals of frequency 4 to 8 KHz.

6. Apparatus according to claim 5, wherein the signal deriving means includes a rectifier and a logarithmic amplifier.

* * * * *